(12) United States Patent
Adachi et al.

(10) Patent No.: US 9,337,565 B2
(45) Date of Patent: May 10, 2016

(54) CONDUCTIVE PATH

(71) Applicant: Yazaki Corporation, Tokyo (JP)

(72) Inventors: Hideomi Adachi, Kosai (JP); Yoshiaki Ozaki, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/247,295

(22) Filed: Apr. 8, 2014

(65) Prior Publication Data

US 2014/0220816 A1 Aug. 7, 2014

Related U.S. Application Data

(63) Continuation of application No. PCT/JP2012/077526, filed on Oct. 18, 2012.

(30) Foreign Application Priority Data

Oct. 18, 2011 (JP) .................................. 2011-228509

(51) Int. Cl.
*H01R 13/52* (2006.01)
*H01B 7/18* (2006.01)
*H01B 13/00* (2006.01)
*H01R 9/03* (2006.01)

(52) U.S. Cl.
CPC ................ *H01R 13/52* (2013.01); *H01B 7/184* (2013.01); *H01R 13/5205* (2013.01); *H01B 13/0009* (2013.01); *H01R 9/032* (2013.01); *Y10T 428/2962* (2015.01)

(58) Field of Classification Search
CPC ........... H01R 13/5221; H01R 13/5208; H01R 13/5205
See application file for complete search history.

(56) References Cited

U.S. PATENT DOCUMENTS

| | | | | |
|---|---|---|---|---|
| 5,562,494 A | * | 10/1996 | Fujiwara | 439/587 |
| 5,897,396 A | * | 4/1999 | Maejima | 439/587 |
| 7,134,911 B2 | * | 11/2006 | Bernhart et al. | 439/587 |
| 2004/0161970 A1 | | 8/2004 | Wlos et al. | |
| 2005/0026488 A1 | * | 2/2005 | Janssen | 439/275 |
| 2005/0042906 A1 | * | 2/2005 | Tabata et al. | 439/274 |
| 2007/0161289 A1 | | 7/2007 | Alloway et al. | |
| 2008/0132104 A1 | | 6/2008 | Iwase et al. | |

(Continued)

FOREIGN PATENT DOCUMENTS

| | | |
|---|---|---|
| CN | 101080786 A | 11/2007 |
| CN | 101404370 A | 4/2009 |

(Continued)

OTHER PUBLICATIONS

International Search Report, dated Jun. 10, 2013, issued by the International Searching Authority in counterpart International Application No. PCT/JP2012/077526.

(Continued)

*Primary Examiner* — Gary Paumen
(74) *Attorney, Agent, or Firm* — Sughrue Mion, PLLC (57) ABSTRACT

There is provided a conductive path. The conductive path includes a conductor and a sheath. The sheath covers the conductor. The sheath is made of a resin composition. The resin composition has elasticity. There are formed protrusions which are convexly protruded from an outer peripheral surface of the sheath of the conductive path and have elasticity so as to be deformed.

7 Claims, 10 Drawing Sheets

(56) References Cited

U.S. PATENT DOCUMENTS

2009/0093159 A1    4/2009    Aoki et al.
2009/0260232 A1    10/2009    Aoki et al.
2010/0048059 A1    2/2010    Lee

FOREIGN PATENT DOCUMENTS

| | | |
|---|---|---|
| CN | 101657942 A | 2/2010 |
| EP | 0 560 050 A1 | 9/1993 |
| EP | 1 447 881 A2 | 8/2004 |
| EP | 1 837 886 A1 | 9/2007 |
| JP | 61-85028 U | 6/1986 |
| JP | 2009-87902 A | 4/2009 |
| JP | 2010-97704 A | 4/2010 |

OTHER PUBLICATIONS

Written Opinion, dated for Jun. 10, 2013, issued by the International Searching Authority in counterpart International Application No. PCT/JP2012/077526.

Communication dated Sep. 29, 2015 issued by Japanese Patent Office in counterpart Japanese Patent Application No. 2011-228509.

Communication from the State Intellectual Property Office of P.R. China dated Jul. 3, 2015 in a counterpart Chinese application No. 201280050926.0.

* cited by examiner

CONDUCTIVE PATH

CROSS REFERENCE TO RELATED APPLICATIONS

This application is a continuation of PCT application No. PCT/JP2012/077526, which was filed on Oct. 18, 2012 based on Japanese Patent Application (No. 2011/228509) filed on Oct. 18, 2011, the contents of which are incorporated herein by reference.

BACKGROUND OF THE INVENTION

1. Field of the Invention

The invention is related to a conductive path that has a waterproofing performance.

2. Description of the Related Art

Figure 8:
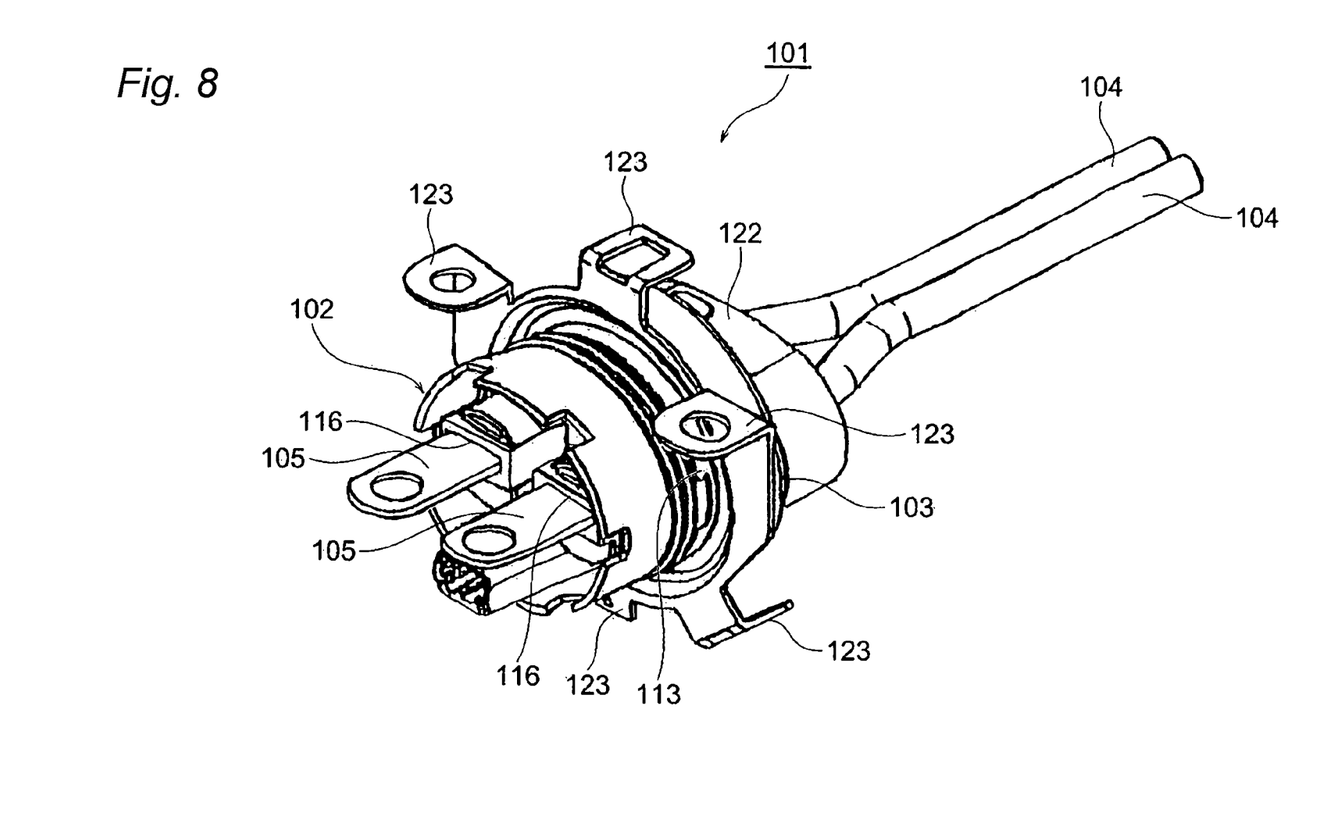
FIG. 8 is a perspective view of a shielded connector in which an electric wire in a related art is accommodated.

An example of shielded connectors is described in the PTL 1, for example. A reference sign 101 of FIG. 8 represents a shielded connector. The shielded connector 101 is formed by including a housing 102, a shield shell 103, two electric wires 104, a terminal fitting 105, a waterproof plug 106, an electromagnetic shielding member 107 and a shield ring 108.

The housing 102 is a resin molded product which has a property of insulating. The housing 102 includes a housing body 113. Inside the housing body 113, a terminal accommodating space 115 and a rear holder accommodating hole 119, which accommodates a rear holder 120 to be described below, are coupled. In the front of the housing body 113, a terminal lead-out hole 116 is formed. The terminal lead-out hole 116 is coupled to the terminal accommodating space 115.

The rear holder 120 is a resin molded product which has the property of insulating. An electric wire through hole 121 penetrates through the rear holder 120.

Figure 9:
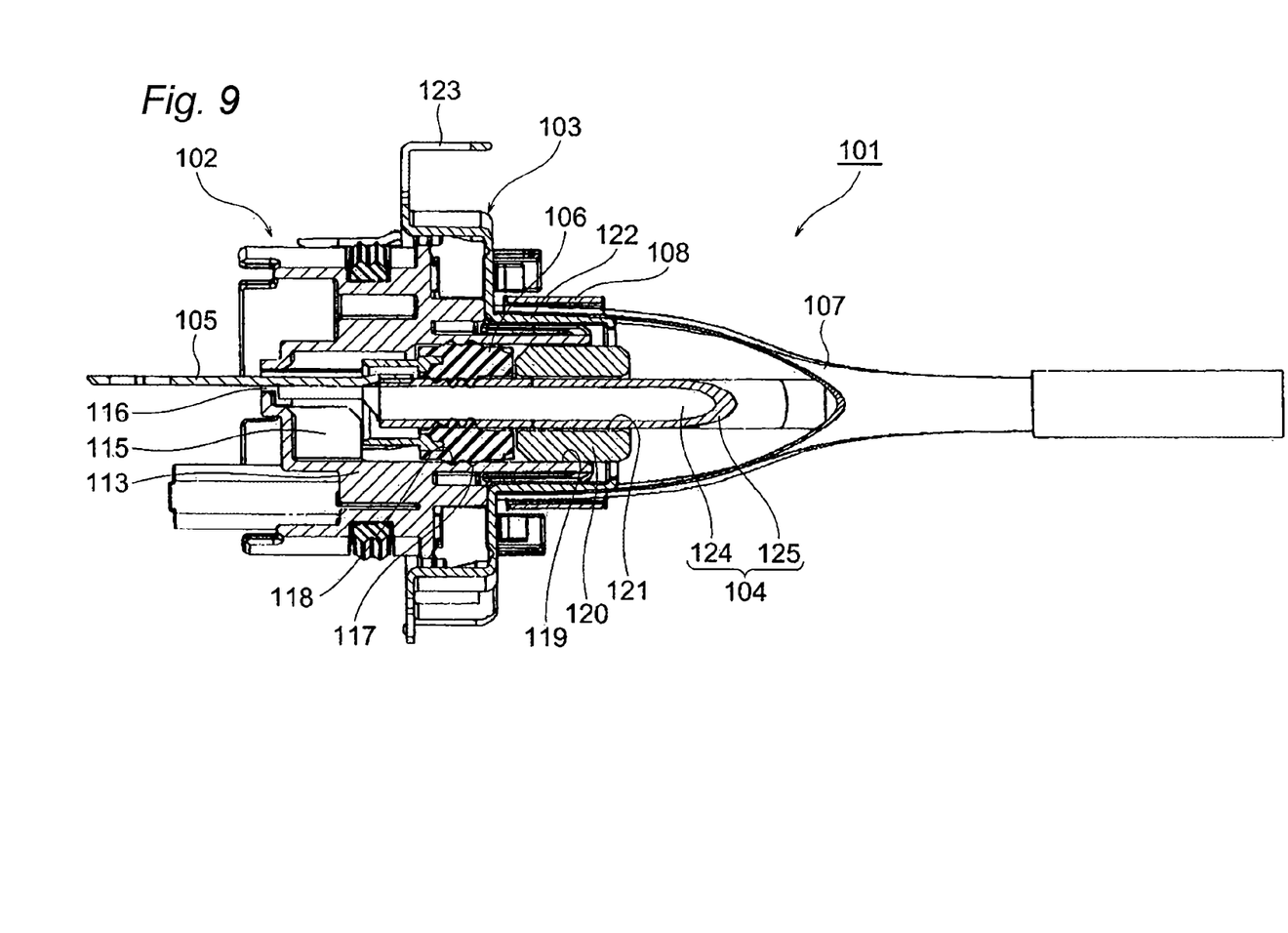
FIG. 9 is a sectional view of the shielded connector in which the electric wire shown in FIG. 8 is accommodated.

The shield shell 103 is a metal molded product that has conductivity. The shield shell 103 includes a shell body 122 and a plurality of shell fixing parts 123, as shown in FIG. 9. The shell body 122 is formed to accommodate the housing body 113 inside. The shell fixing parts 123 are coupled to the outer edge of the shell body 122.

The electromagnetic shielding member 107 is formed to be opened at one end, and is arranged to a periphery of the shell body 122 of the shield shell 103, as shown in FIG. 9. The electromagnetic shielding member 107 collectively covers the two electric wires 104. The electromagnetic shielding member 107 is crimped by the shield ring 108 which is a conductive metal molded product.

Figure 10:
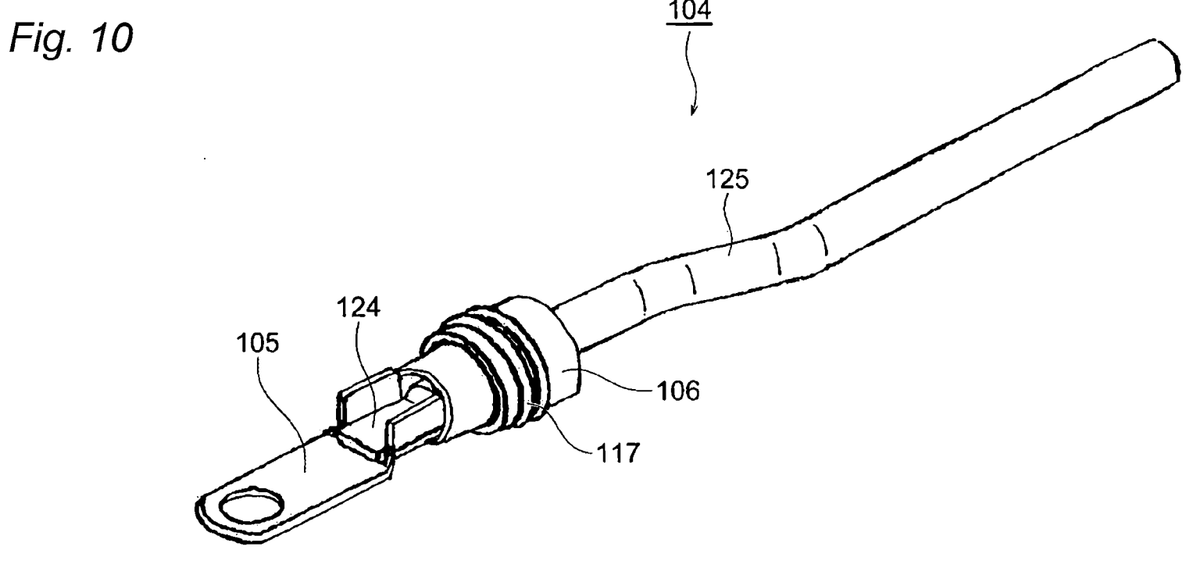
FIG. 10 is a perspective view of the electric wire shown in FIGS. 8 and 9.

The electric wire 104 includes a conductor 124 and an insulator 125 which is coated on a periphery of the conductor 124, as shown in FIG. 10. The terminal fitting 105, which is connected to a terminal of the electric wire 104, is formed by forging a metal plate that has conductivity.

The waterproof plug 106 is a resin molded product which is made of, for example, rubber that has the property of insulating. The waterproof plug 106 is substantially formed into a cylindrical shape. Annular sealing protrusions 117 are formed on an outer peripheral surface of the waterproof plug 106. The annular sealing protrusions 117 are formed to have such a height that, as described below, when the annular sealing protrusions 117 are inserted into the terminal accommodating space 115 after being installed to the electric wire 104, the annular sealing protrusions 117 are crushed on the inner wall surface 118 of the terminal accommodating space 115 and a highly tight adherence of the waterproof plug 106 and the inner wall surface 118 can be maintained.

In the assembling of the electric wire 104, the terminal fitting 105 and the waterproof plug 106, a process is performed beforehand so that the conductor 124 is exposed by only stripping a predetermined length of the insulator 125 at a terminal of the electric wire 104. Then, the waterproof plug 106 is inserted from the terminal of the electric wire 104 and installed to the periphery of the insulator 125 at the terminal. Then the assembling is completed by electrically connecting the terminal fitting 105 to the conductor 124.

When the electric wire 104 to which the waterproof plug 106 is installed is inserted into the terminal accommodating space 115 of the housing body 113, the annular sealing protrusions 117 of the waterproof plug 106 are crushed by the inner wall surface 118 of the terminal accommodating space 115, and a highly tight adherence of the waterproof plug 106 and the inner wall surface 118 is maintained. Thereby, the inside of the terminal accommodating space 115 is maintained in a water tight state.

CITATION LIST

Patent Literature

[PTL 1] JP-A-2009-087902

SUMMARY OF THE INVENTION

In the above shielded connector, although a water tight state inside the terminal accommodating space 115 can be maintained by the waterproof plug 106, there are the following problems. In the shielded connector, by attaching the waterproof plug 106 to the electric wire 104, the waterproof plug 106 intervenes in a gap between the inner wall surface 118 of the terminal accommodating space 115 and the insulator 125 of the electric wire 104 so that a water tight state can be maintained by tightly adhering the annular sealing protrusions 117 to the inner wall surface 118. Although, according to this structure, it is necessary to provide a number of waterproof plugs 106 in accordance with the number of the electric wires 104, and thus there is a problem that a number of components is increased. The concerned problem will lead to the increase of cost on producing the electric wires 104. Further, during the assembling of the electric wire 104, the terminal fitting 105 and the waterproof plug 106, the terminal fitting 105 must be connected to a terminal of the electric wire 104 after the waterproof plug 106 is attached to the electric wire 104 beforehand, a working man-hours related to the assembling of the electric wire 104 increase and this will have an influence on the workability in the production.

It is therefore one advantageous aspect of the present invention to provide a conductive path so that by removing the waterproof plug in the related art, the number of components and the producing cost can be reduced and the workability in the production also can be improved.

According to one advantage of the invention, there is provided a conductive path, comprising:

a conductor; and a sheath covering the conductor, wherein the sheath is made of a resin composition having elasticity, and wherein protrusions are convexly protruded from an outer peripheral surface of the sheath and have elasticity so as to be deformed.

According to another advantage of the invention, there is provided a shielded connector, comprising:

a holder; and a wire, inserted in to the holder, and including a conductor and a sheath covering the conductor, wherein the sheath is made of a resin composition having elasticity, and wherein protrusions are convexly protruded from an outer peripheral surface of the sheath, and have elasticity so as to be deformed to come in contact with the holder so as to prevent an ingress of liquid into the shielded connector.

The resin composition may include silicone.

According to the present invention, the sheath of the conductive path itself has elasticity and the protrusions having the function of the annular sealing protrusions of the waterproof plug are directly formed on the outer peripheral surface of the sheath. In this case, because the protrusions are crushed on and tightly adhered to the inner wall surface of the terminal accommodating space when the concerned conductive path is inserted into the terminal accommodating space formed inside the shielded connector, even if the waterproof plug is not used, the terminal accommodating space can have a water tight structure.

According to the present invention, in consideration of durability, heat resisting property and electrical insulating property, the sheath of the conductive path is formed by silicone that is superior in these properties.

According to the present invention, the number of components and the producing cost are reduced, and the workability in the production is improved.

According to the present invention, the conductive path using the superior sheath can be provided.

DETAILED DESCRIPTION OF THE EXEMPLARY EMBODIMENTS

Figure 1:
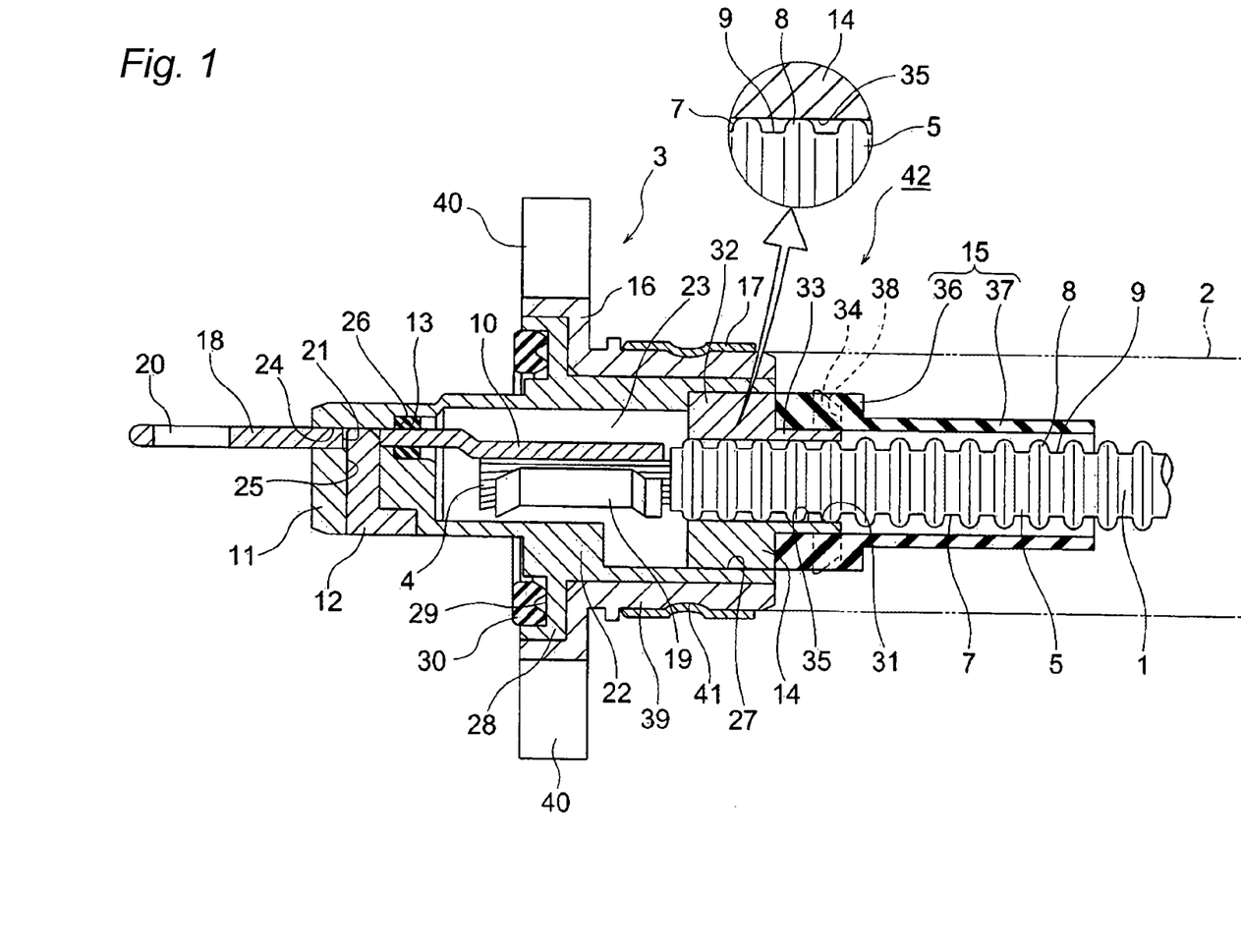
FIG. 1 is a sectional view of a shielded connector in which a conductive path according to an embodiment of the present invention is accommodated.
Figure 2:
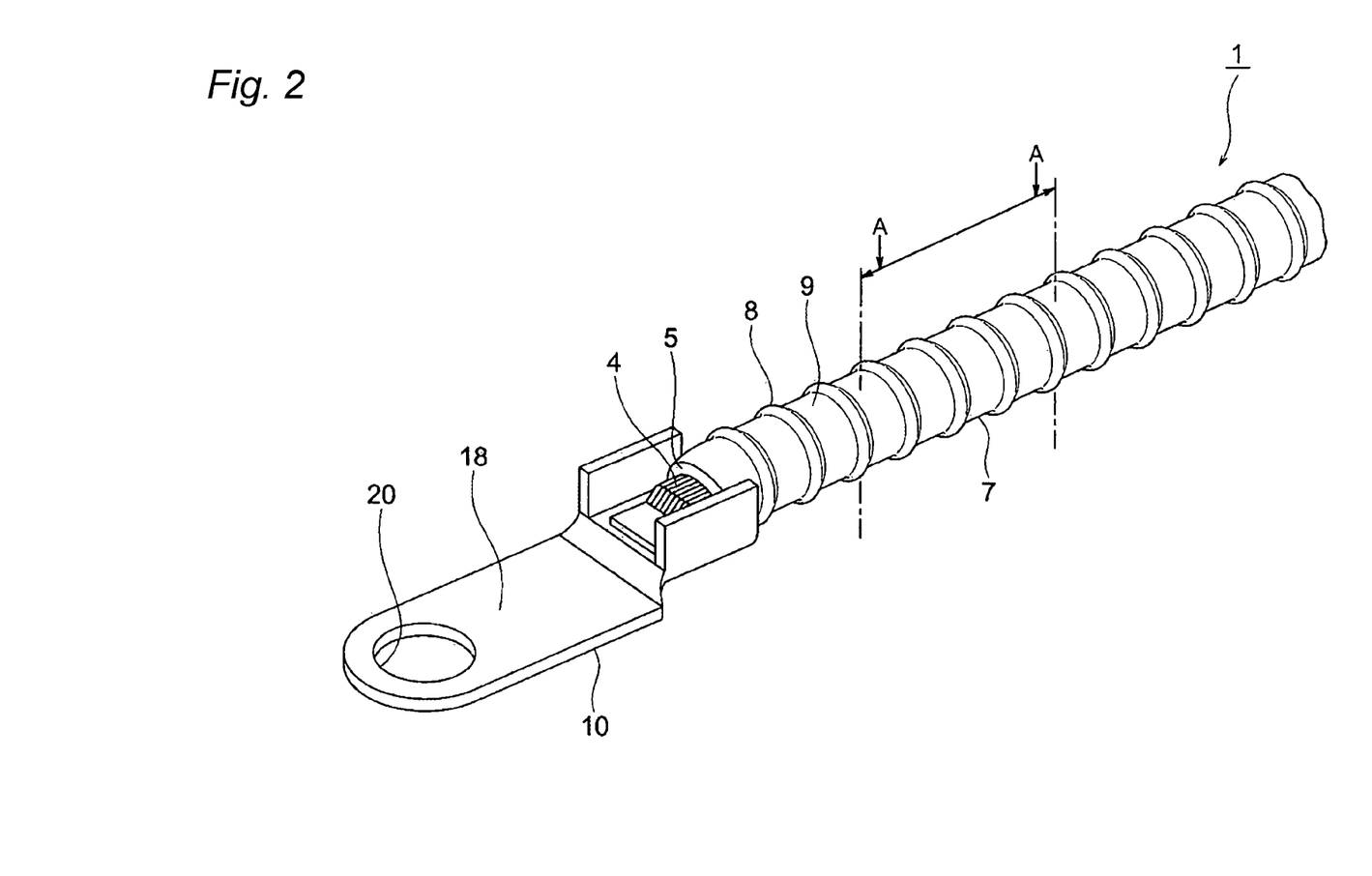
FIG. 2 is a perspective view of the conductive path shown in FIG. 1.
Figure 3:
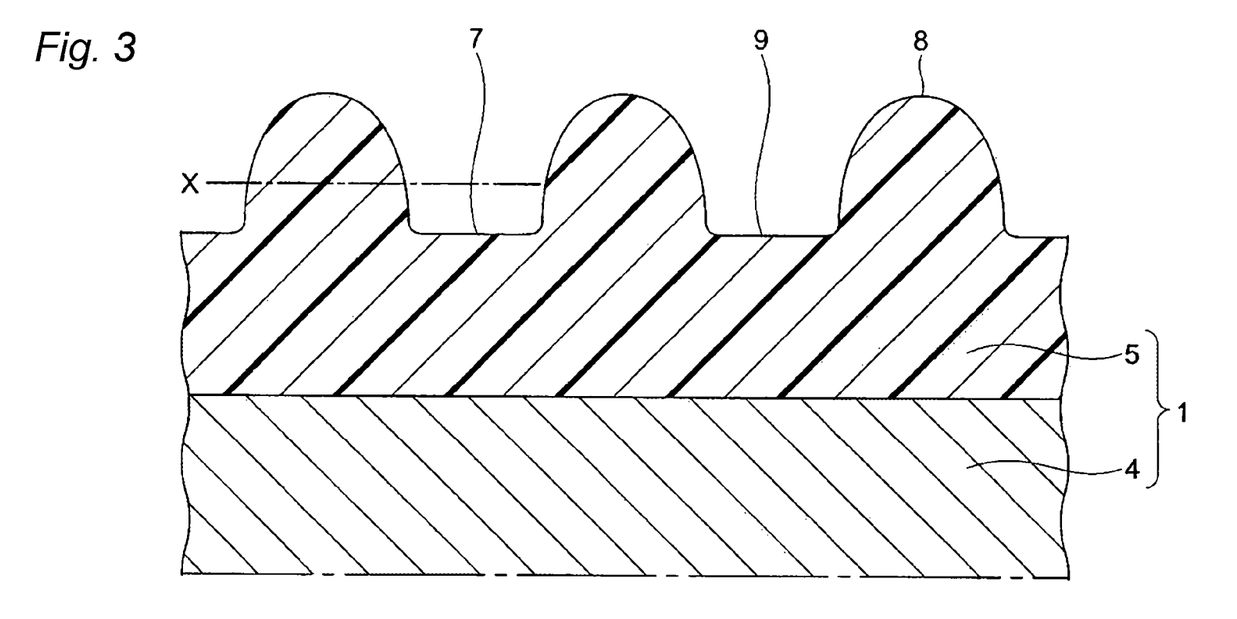
FIG. 3 is a sectional view of the conductive path along A-A line in FIG. 2.
Figure 4:
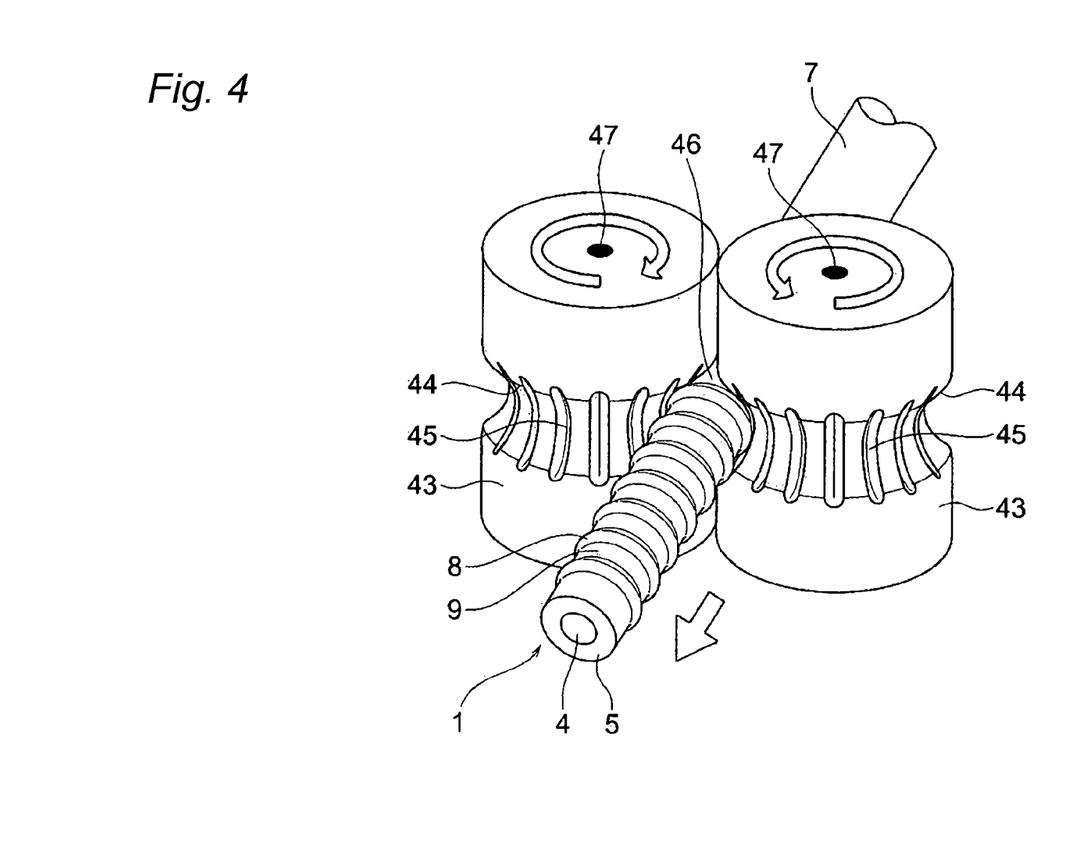
FIG. 4 is a figure which shows a method of producing the conductive path shown in FIG. 2.
Figure 5A:
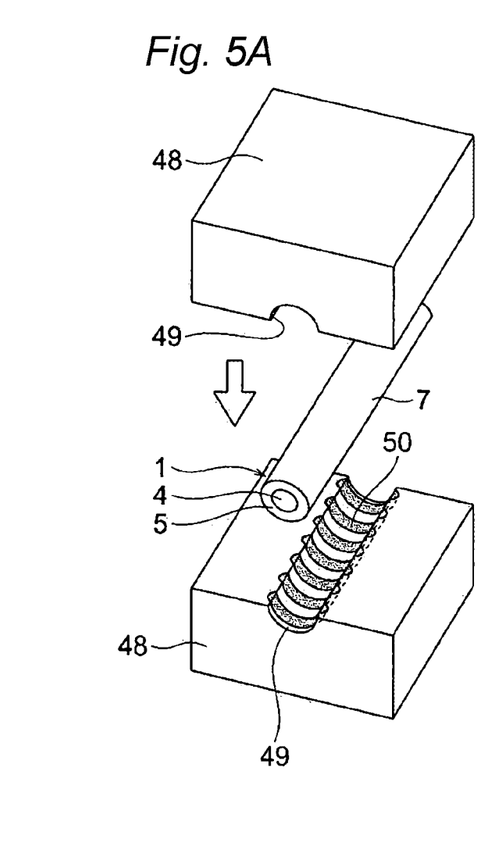
FIGS. 5A to 5C are figures which show another method of producing the conductive path shown in FIG. 2.
Figure 5B:
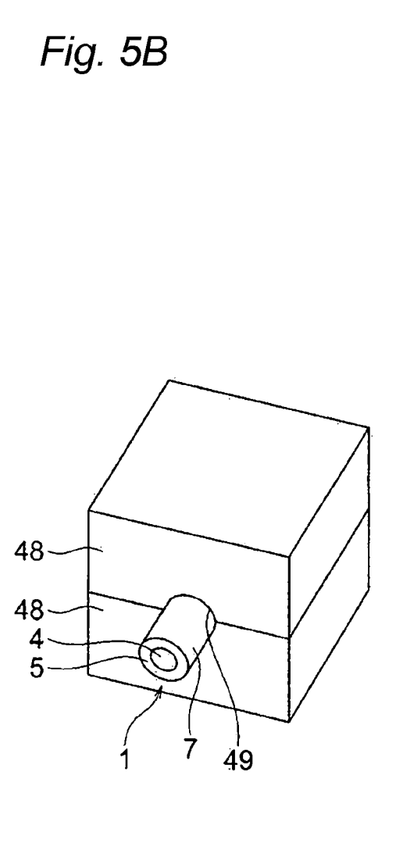
Figure 5C:
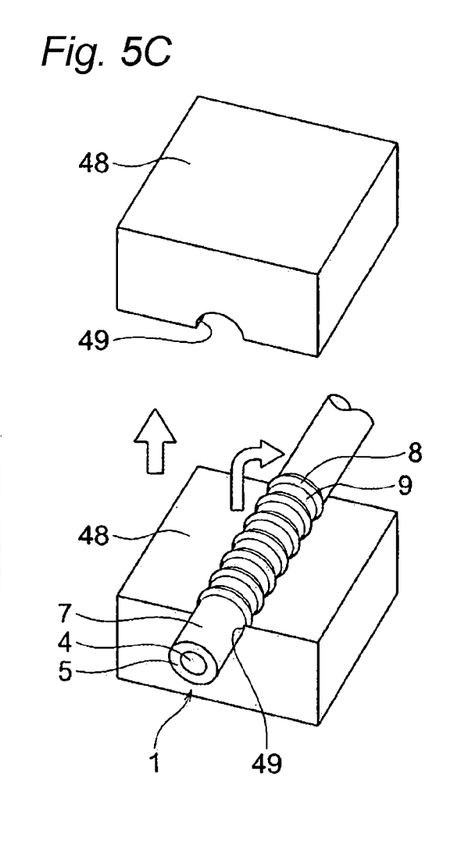

Embodiments of the invention will be described with reference to the figures. FIG. 1 is a sectional view of a shielded connector in which a conductive path of the present invention is accommodated. FIG. 2 is a perspective view which shows that the conductive path of the invention and a terminal fitting are connected and fixed. FIG. 3 is an A-A sectional view in FIG. 2. FIG. 4 is a figure which shows a method of forming lip parts across the full length of the conductive path of the invention. FIGS. 5A to 5C are figures which show a method of forming lip parts partially or intermittently on the outer peripheral surface of the sheath of the conductive path of the invention.

In the following description, specific shapes, materials, numerical values, directions and the like are illustrated to facilitate the understanding of the present invention and may be changed appropriately in accordance with applications, objects and specifications.

In FIG. 1, a wire harness 42 is formed by including two electric wires 1, an electromagnetic shielding member 2 (shielding member) which collectively shields the two electric wires 1, an exterior member which is not shown and which is provided outside the electromagnetic shielding member 2, an inverter side shielded connector 3 which is provided at one end of the electric wire 1 (referred to as "shielded connector 3"), and a battery side shielded connector which is not shown and which is provided at the end. The battery side shielded connector which is not shown is formed basically like the above-mentioned shielded connector 3.

As shown in FIG. 2, the electric wire 1 is a high voltage conductive path including a conductor 4 and an insulator 5, and the electric wire 1 is formed by sheath the outside of the conductor 4 with the insulator 5. The electric wire 1 is processed so that the conductor 4 is exposed by only stripping a predetermined length of the insulator 5 at a terminal of the electric wire 1. Herein, a conductor structure formed by twisting strands is used as the conductor 4. The strands are made of copper, copper alloy, aluminum or aluminum alloy. The conductor 4 is formed into a shape whose section is substantially rounded, but should not be particularly limited. The conductor 4 may be formed into a rod-like conductor structure whose section is a round shape (for example, a round single core). Electric wires are used in the present embodiment, but the invention shall not be limited to this. That is, it is also possible to provide an insulator to a well-known busbar to be used as a high voltage conductive path.

The insulator 5 is formed by extruding resin material, which has the property of insulating, and sheath the resin material on the outside of the conductor 4, and in consideration of durability, heat resisting property and electrical insulating property and in consideration of the formation of lip parts 8 (protrusions) to be described below, silicone may used herein.

The insulator 5 in the present embodiment is equivalent to the "sheath" described in claims.

As shown in FIG. 3, a plurality of lip parts (protrusions) 8 are directly formed on the outer peripheral surface 7 of the insulator 5. The lip part 8 is formed into an annular lip shape, and the outer edge of the lip part 8 when viewed in a section of the lip part 8 is formed into an arc shape. Annular recesses 9 are formed between the lip parts 8.

The lip part 8 is formed to be protruded convexly from the outer peripheral surface 7 of the insulator 5. The lip parts 8 are formed so that when the electric wire 1 is inserted into the electric wire through hole 31 of the rear holder 14 to be described below, the lip parts 8 tightly adhere to the inner wall surface 35 of the electric wire through hole 31. In other words, the lip parts 8 are formed to contact in a water tight way. The lip parts 8 are convexly protruded from the outer peripheral surface of the sheath, and are configured to come in contact with the rear holder 14 so as to prevent an ingress of liquid into the shielded connector 3.

The annular recesses 9, which are formed to connect the lip parts 8, are formed to sink under the outer peripheral surface 7 of a flat insulator 5 where the lip parts 8 and the annular recesses 9 were not formed, as shown in FIG. 3. The outer peripheral surface 7 is equivalent to a virtual line X shown in FIG. 3.

The lip parts 8 are formed to have such a height that when the electric wire 1 is inserted into the electric wire through hole 31 of the rear holder 14 to be described below, deformation is produced since the lip parts 8 are crushed on the inner wall surface 35 of the electric wire through hole 31, and a highly tight adherence of the outer peripheral surface 7 of the insulator 5 and the inner wall surface 35 of the electric wire through hole 31 can be maintained.

As shown in FIG. 1, the lip parts 8 are formed to parts where the outer peripheral surface 7 of the insulator 5 and the inner wall surface 35 of the electric wire through hole 31 touch at predetermined intervals. That is, the lip parts 8 are formed at parts at least necessary for waterproofing. The distance between the lip parts 8 may be changed appropriately. The lip parts 8 are formed across the full length of the electric wire 1. In addition, the lip parts 8 may be partially formed only on the outer peripheral surface 7 of the terminal of the electric wire 1 or only on the outer peripheral surface 7 in the middle of the electric wire 1, or the lip parts 8 may be formed intermittently on the outer peripheral surface 7 of the electric wire 1 at predetermined intervals.

The number of formed lip parts 8 may be appropriately changed to two or three, and it is also possible to only form one lip part 8. However, it is desirable to form two or more lip parts in consideration of the stability of the state that the electric wire 1 is inserted into the electric wire through hole 31.

The electromagnetic shielding member 2 is a member for playing an electromagnetic shielding function, and, for example, is formed by striking a web or a metal foil into a pipe form. As shown in FIG. 1, one end of the electromagnetic shielding member 2 is fixed to an inverter side shield shell 16 to be described below, by being crimped, for example. Further, the other end is likewise fixed to a motor side shielded connector which is not shown. This fixation of the electromagnetic shielding member 2 shall be one example.

The shielded connector 3 is inserted into a shield case of the inverter unit, and has a structure suitable for electrical connection to be accomplished in the inside. The shielded connector 3 is formed by including a terminal fitting 10, a housing 11, a terminal locking member 12, a sealing member 13 for waterproofing, a rear holder 14, an insulative cover 15, a shield shell 16 and a shield ring 17.

As shown in FIG. 2, the terminal fitting 10 is formed by forging a metal plate that has conductivity. Herein, a male model is used as the terminal fitting 10. The terminal fitting 10 has an electrical contact part 18 and a conductor connecting part 19 which is integrally connected to the electrical contact part 18.

The electrical contact part 18 is formed into a tab shape. A first through hole 20 and a second through hole 21 are formed in the electrical contact part 18, as shown in FIG. 1. The first through hole 20 is formed as a part used for electrical connection inside the inverter unit. On the other hand, the second through hole 21 is formed as a part that is locked by a terminal locking member 12. In addition, as shown in FIG. 2, it is also possible that the second through hole 21 is not formed and the locking with the terminal locking member 12 is omitted. FIG. 2 is shown as a variation of FIG. 1. Either of FIGS. 1 and 2 may be adopted.

The conductor connecting part 19 is formed to be able to be connected and fixed to the conductor 4 of the electric wire 1. In this embodiment, the conductor connecting part 19 is formed into a barrel shape so that it is possible to press bond and connect to the conductor 4 by crimping. The connection may be the welding as shown in FIG. 2. FIG. 2 is shown as a variation of FIG. 1. Either of FIGS. 1 and 2 may be adopted.

The housing 11 is a resin molded product which has the property of insulating (insulative member), has a housing body 22, and is formed into a shape shown in FIG. 1. The shape shall be one example.

A terminal accommodating space 23 is formed inside the housing body 22. The terminal accommodating space 23 is formed to be able to mainly accommodate the conductor connecting part 19 of the terminal fitting 10 which is connected and fixed to the conductor 4 of the electric wire 1. The electrical contact part 18 is protruded from the front end of the housing 11 into the terminal accommodating space 23 through a terminal lead-out hole 24 which penetrates towards the front end of housing 11.

A terminal locking member accommodating hole 25 which communicates with the terminal lead-out hole 24 is formed in the housing body 22 from the lower part towards the upper part. The second through hole 21 is locked by the terminal locking member 12 that is fitted in the terminal locking member accommodating hole 25, and thereby it becomes impossible to pull out the terminal fitting 10.

A sealing member accommodating hole 26 is formed at a connecting part of the terminal accommodating space 23 and the terminal lead-out hole 24. The sealing member 13 which is accommodated in the sealing member accommodating hole 26 contacts with the electrical contact part 18 in a water tight way.

A rear holder accommodating hole 27 is formed in the terminal accommodating space 23 to connect to the rear of the rear holder accommodating hole 27. The rear holder accommodating hole 27 is formed into such a shape that the rear holder 14 can be fitted.

A flange part 28 is formed at the outside the housing body 22. A sealing member accommodating hole 29 is formed in this flange part 28. A sealing member 30, which is accommodated in the sealing member accommodating hole 29, contacts with the shield case of the inverter unit in a water tight way.

The rear holder 14 is a resin molded product which has the property of insulating, and is formed in a state, although not particularly shown in the figure, that the rear holder 14 can be divided in two parts. The rear holder 14 has an electric wire through hole 31 which penetrates with a predetermined diameter, a fitting part 32 of a large diameter which is fitted in the rear holder accommodating hole 27, an electric wire lead-out part 33 of a small diameter which is integrally connected to the fitting part 32 and where the electric wire 1 is drawn out, and a convex locking part 34 which is formed to be protruded, for example, upwards and downwards at one end of the electric wire lead-out part 33. The convex locking part 34 is formed so that the insulative cover 15 can be regulated from falling out by being hooked.

The electric wire through hole 31 has an inner wall surface 35. The inner wall surface 35 of the electric wire through hole 31 is a part which the above mentioned lip parts 8 contact with. That is, the inner wall surface 35 of the electric wire through hole 31 is the part necessary for waterproofing.

The electric wire through hole 31 is formed to have such a diameter that when the electric wire 1 is inserted into the electric wire through hole 31, deformation is produced since the lip parts 8, which are formed on the outer peripheral surface 7 of the insulator 5, are crushed on the inner wall surface 35 of the electric wire through hole 31, and a highly tight adherence of the outer peripheral surface 7 of the insulator 5 and the inner wall surface 35 of the electric wire through hole 31 can be maintained.

The insulative cover 15 is provided as a counterpart member of the rear holder 14. The insulative cover 15 is a member that has flexibility, and herein is provided as a member of rubber (made of elastomer). The insulative cover 15 is formed into a substantially pipe form, and has a locking part 36 of a large diameter and a cover part 37 which extends backwards from the locking part 36. A concave locking part 38, which is locked by being caught to the convex locking part 34 of the rear holder 14, is locked in the locking part 36.

The insulative cover 15 is a useful member when, for example, an external force or the like is temporarily added to the wire harness 42. The reason for this is described as follows.

When an external force or the like is temporarily added to the wire harness 42, the force is applied onto the connecting portion of the conductor connecting part 19 of the conductor 4 of the electric wire 1 and the terminal fitting 10. Thus, the conductor 4 may be cut at the connection portion. In particularly, a part of the conductor 4 remains in the crimped portion in the conductor connecting part 19, and the electric wire 1 side is cut in a state that the end of the cut portion of the conductor 4 (not shown in the figure) is exposed. At this time, because the outside of the cut end of the conductor 4 is covered by the insulative cover 15 although the end of the cut portion of the conductor 4 is exposed, the electric wire 1 is in a state that the electrical contact with the electromagnetic shielding member 2 is regulated.

Therefore, because the exposure of the end of the cut portion of the conductor 4 is prevented with the existence of the insulative cover 15 and safety can be ensured, it may be said that the insulative cover 15 is a useful member when an external force or the like is added.

The shield shell 16 is a so-called metal shell that has conductivity, and has a substantially pipe-like shell body 39 and a plurality of shell fixing parts 40. The shell body 39 is formed into such a shape that the housing body 22 can be accommodated inwards. The shell fixing part 40 is formed into a shape to be fixed to the shield case of the inverter unit using a fixing bolt which is not shown.

A crimped part 41 is formed in the shell body 39. One end of the electromagnetic shielding member 2 is adapted to be sandwiched between the crimped part 41 and the shield ring 17. The electromagnetic shielding member 2 will be electrically connected to the shield case when the one end of the electromagnetic shielding member 2 is sandwiched and fixed by being crimped.

The shield ring 17 is a conductive metal component, and is formed into a ring shape. The shield ring 17 is crimped by being installed to the crimped part 41.

Next, a method of assembling the electric wire 1 to the shielded connector 3 is described.

As shown in FIG. 1, the electric wire 1 is accommodated in the shielded connector 3 in a state that the conductor 4 and the conductor connecting part 19 of the terminal fitting 10 are electrically connected. At this time, the conductor connecting part 19 is accommodated in the terminal accommodating space 23 of the housing body 22.

When the conductor connecting part 19 is accommodated in the terminal accommodating space 23, among the electric wire 1, a portion of the insulator 5 is in a state that the lip parts 8 are tightly crushed by the inner wall surface 35 of the rear holder 14. Thereby, the outer peripheral surface 7 of the insulator 5 and the inner wall surface 35 of the rear holder 14 are maintained in a water tight state. Because the lip parts 8 that are formed on the outer peripheral surface 7 of the portion of the insulator 5 that is inserted into the electric wire through hole 31 of the rear holder 14 is crushed to the inner wall surface 35 of the rear holder 14, the crushed portion of the lip parts 8 becomes lower than those portion of the lip parts 8 that are formed on the outer peripheral surface 7 of the portion of the insulator 5 that is not inserted into the electric wire through hole 31.

Next, methods of producing the electric wire 1 of the present embodiment are described.

First, a method of forming the lip parts 8 across the full length of the electric wire 1 of the present embodiment is described.

As shown in FIG. 4, a procedure is shown when the lip parts 8 are formed on the outer peripheral surface 7 of the insulator 5 by rolling up the electric wire 1 in rollers 43 and 43 right after the insulator 5 is extruded and molded on the periphery of the conductor 4. The rollers 43 and 43 are provided as two rollers, and the rollers 43 and 43 abut against each other and stand in a row. On the side surfaces of the rollers 43 and 43, annular groove parts 44 and 44 are formed respectively. Lip part forming grooves 45 and 45 are formed on the annular groove parts 44 and 44. In the part where the rollers 43 and 43 abut against each other, a tunnel 46 is formed which has such a diameter that when the electric wire 1 passes, the insulator 5 is pressed to conform with the annular groove parts 44 and 44, and the lip parts 8 in the present embodiment can be formed. In the rollers 43 and 43, for example, one roller 43 rotates clockwise around a rotation axis 47, and the other roller 43 rotates counterclockwise around another rotation axis 47. Thus, when the electric wire 1 passes the tunnel 46 that conforms with the annular groove parts 44 and 44 towards the direction of the arrow shown in FIG. 4, the outer peripheral surface 7 of the insulator 5 is pressed by the rollers 43 and 43, and the lip parts 8 are continuously formed. The lip parts 8 are continuously formed as far as the rollers 43 and 43 continue driving. Thereby, the lip parts 8 can be formed across the full length of the electric wire 1. The shape of the lip parts 8 becomes stable by cooling off the insulator 5. Thereby, the electric wire 1 of the present embodiment can be produced.

Next, a method of forming the lip parts 8 partially or intermittently on the outer peripheral surface 7 of the electric wire 1 of the present embodiment is described.

FIGS. 5A to 5C show procedure when the lip parts 8 are formed at a terminal of the electric wire 1. As shown in FIG. 5A, first, in the electric wire 1 right after the insulator 5 is extruded and molded on the periphery of the conductor 4, the part where the lip parts 8 are to be formed is set in metal molds 48 and 48. In FIG. 5A, it is described that the lip parts 8 are formed on the outer peripheral surface 7 of the terminal of the electric wire 1, but the invention is not limited to this, and a desired part such as the middle of the electric wire 1 may be set in the metal molds 48 and 48. The joining surfaces of the top and bottom metal molds 48 and 48 are provided with groove parts 49 and 49 which the electric wire 1 passes through. Lip part forming grooves 50 and 50 are formed on the groove parts 49 and 49. Then, as shown in FIG. 5B, after the electric wire 1 has been set in the groove part 49 of the bottom metal mold 48, the top metal mold 48 is tightened. As shown in FIG. 5C, the top and bottom metal molds 48 and 48 are opened and the electric wire 1 in which the lip parts 8 are formed on the outer peripheral surface 7 of the insulator 5 is taken out. Thereby, the electric wire 1 in which the lip parts 8 are partially formed on the outer peripheral surface 7 of the insulator 5 is produced. After a part of the electric wire 1 is tightened with the metal molds 48 and 48 and the lip parts 8 are formed, the metal molds 48 and 48 are opened, the electric wire 1 is moved forwards, and a part where the lip parts 8 were not formed is tightened as above mentioned. By repeating these procedures, the lip parts 8 can be intermittently formed at predetermined intervals. Thereby, the electric wire 1 of the present embodiment can be produced. A method of heating and using the metal molds 48 and 48 may be possible.

As described with reference to FIGS. 1 to 5C, according to the present invention, since a plurality of lip parts 8 are directly formed on the insulator 5, an effect is achieved that the number of components and the producing cost are reduced than before. Also, an effect is achieved that the workability in the production is improved. Further, an effect is achieved that the electric wire 1 using the superior insulator 5 can be provided.

Figure 6:
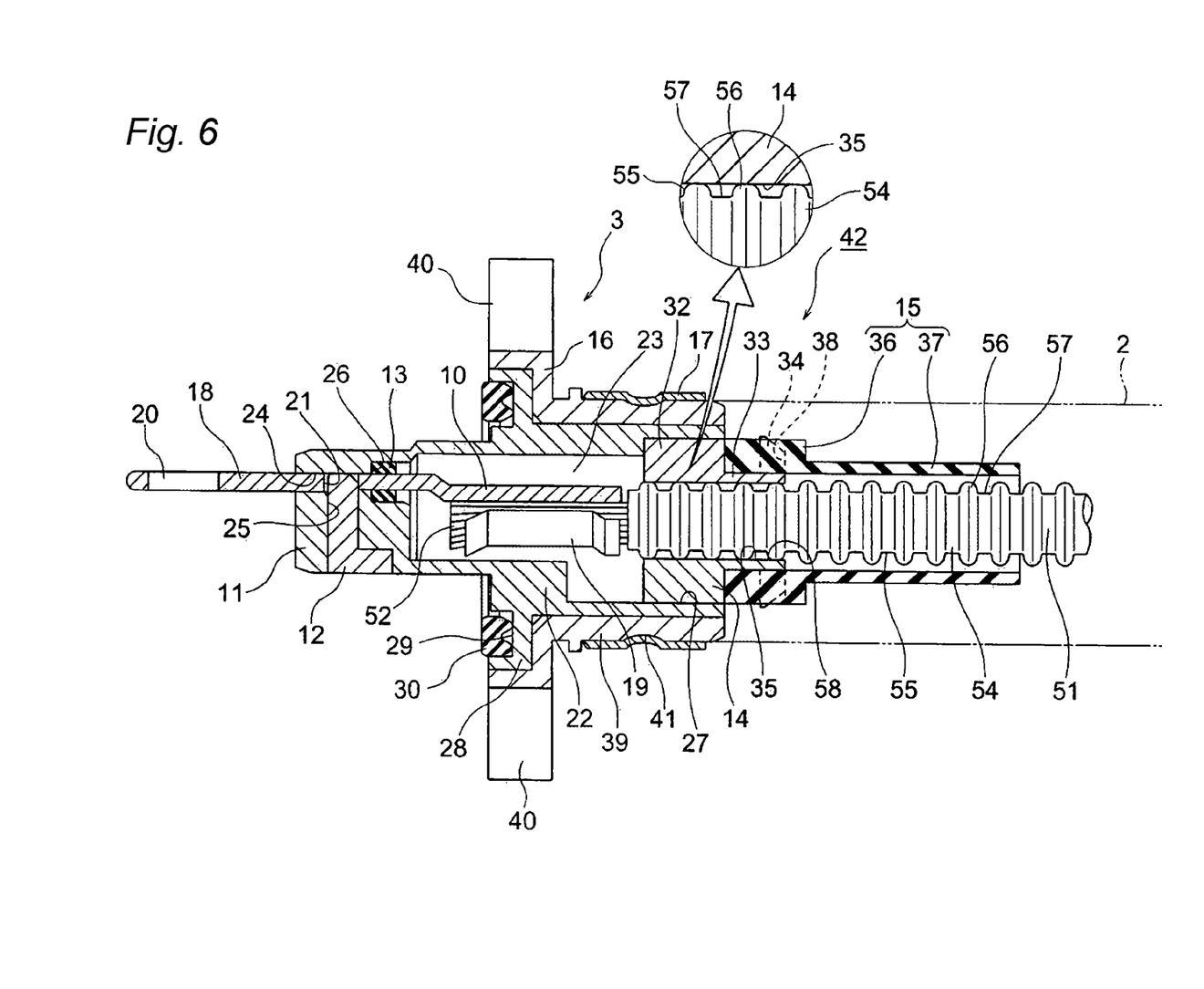
FIG. 6 is a sectional view of a shielded connector in which a conductive path according to another embodiment of the invention is accommodated.
Figure 7:
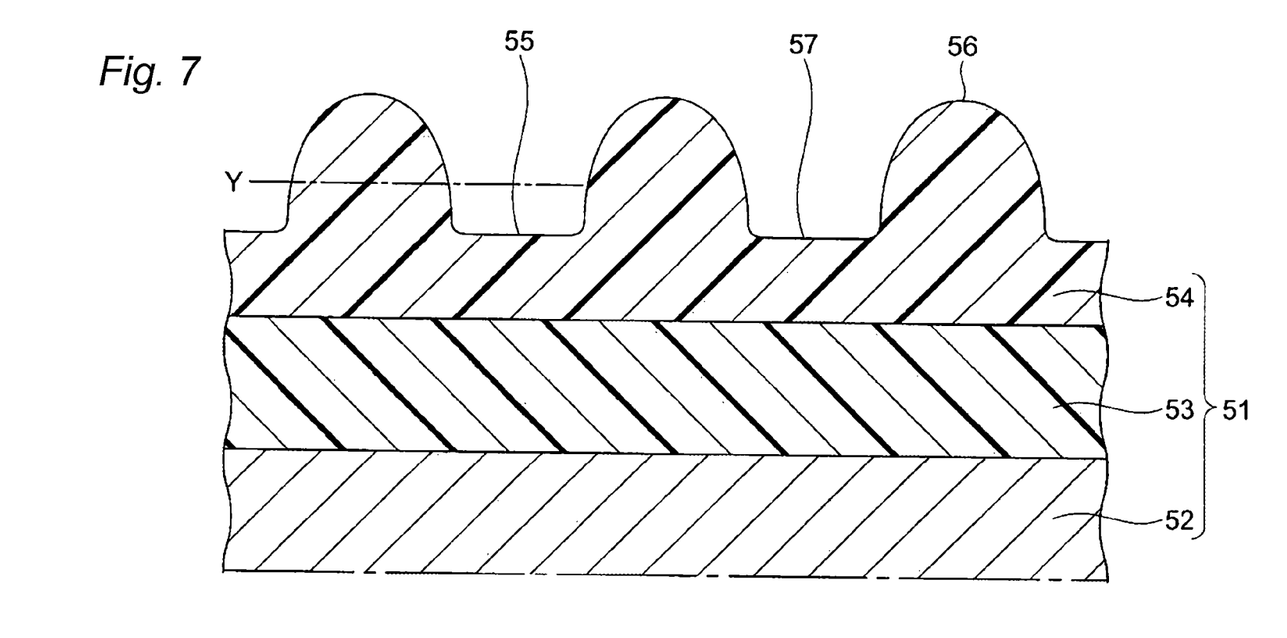
FIG. 7 is a sectional view of the conductive path shown in FIG. 6.

Below, another embodiment of the invention will be described with reference to the figures. FIG. 6 is a sectional view of a shielded connector in which a conductive path of the embodiment is accommodated. FIG. 7 is a sectional view which shows another embodiment of conductive paths. Furthermore, the components that are identical with those in the above-mentioned embodiment are given identical numbers, and their detailed description is omitted.

The present embodiment is the same as the above mentioned embodiment except a point that the electric wire 1 of the above mentioned embodiment is changed to a cable 51 to be described below. Thus, the cable 51 is described as follows.

As shown in FIG. 7, the cable 51 is a high voltage conductive path including a conductor 52, an insulator 53 and a sheath 54, and is formed by sheath the outside of the conductor 52 with the insulator 53 and sheath the outside of the insulator 53 with the sheath 54. The cable 51 is processed so that the conductor 52 is exposed by only stripping a predetermined length of the insulator 53 and the sheath 54 at a terminal of the electric wire 51. The conductor 52 is the same as the above mentioned conductor 4.

The insulator 53 is formed by extruding resin material, which has the property of insulating, and sheath the resin material on the outside of the conductor 52, and what is well-known is used herein.

The sheath 54 is formed by extruding resin material, which has the property of insulating, and sheath the resin material on the outside of the insulator 53, and in consideration of durability, heat resisting property and electrical insulating property and in consideration of the formation of lip parts 56 to be described below, silicone may be used herein.

The sheath 54 in the present embodiment is equivalent to the "sheath" described in claims.

As shown in FIG. 7, a plurality of lip parts (protrusions) 56 are directly formed on the outer peripheral surface 55 of the sheath 54. The lip part 56 is formed into an annular lip shape, and the outer edge of the lip part 56 when viewed in a section of the lip part 56 is formed into an arc shape. Annular recesses 57 are formed between the lip parts 56.

The lip part 56 is formed to be protruded convexly from the outer peripheral surface 55 of the sheath 54. As shown in FIG. 6, the lip parts 56 are formed so that when the cable 51 is inserted into the cable through hole 58 of the rear holder 14, the lip parts 8 tightly adhere to the inner wall surface 35 of the cable through hole 58. In other words, the lip parts 56 are formed to contact in a water tight way. The lip parts 56 are convexly protruded from the outer peripheral surface of the sheath, and are configured to come in contact with the inner wall surface 35 of the cable through hole 58 so as to prevent an ingress of liquid into the shielded connector 3.

The annular recesses 57, which are formed to connect the lip parts 56, are formed to sink under the outer peripheral surface 55 of a flat sheath 54 where the lip parts 56 and the annular recesses 57 were not formed, as shown in FIG. 7. The outer peripheral surface 55 is equivalent to a virtual line Y shown in FIG. 7.

As shown in FIG. 6, the lip parts 56 are formed to have such a height that when the cable 51 is inserted into the cable through hole 58 of the rear holder 14, deformation is produced since the lip parts 56 are crushed on the inner wall surface 35 of the cable through hole 58, and a highly tight adherence of the outer peripheral surface 55 of the sheath 54 and the inner wall surface 35 of the cable through hole 58 can be maintained.

As shown in FIG. 6, the lip parts 56 are formed to parts where the outer peripheral surface 55 of the sheath 54 and the inner wall surface 35 of the cable through hole 58 touch at predetermined intervals (that is, parts at least necessary for waterproofing). The distance between the lip parts 56 may be changed appropriately. The lip parts 56 are formed across the full length of the cable 51. In addition, the lip parts 56 may be partially formed only on the outer peripheral surface 55 of the terminal of the cable 51 or only on the outer peripheral surface 55 in the middle of the cable 51, or the lip parts 8 may be formed intermittently on the outer peripheral surface 55 of the sheath 54 at predetermined intervals.

The number of formed lip parts 56 may be appropriately changed to two or three, and it is also possible to only form one lip part 56. However, it is desirable to form two or more lip parts in consideration of the stability of the state that the cable 51 is inserted into the cable through hole 58.

As described with reference to FIGS. 1 to 7, according to the present invention, since a plurality of lip parts 56 are directly formed on the sheath 54, an effect is achieved that the number of components and the producing cost are reduced than before. Also, an effect is achieved that the workability in the production is improved. Further, an effect is achieved that the cable 51 using the superior sheath 54 can be provided.

The above-mentioned embodiment is merely a typical example of the present invention, and the present invention is not limited to the embodiment. That is, the present invention can be variously modified and implemented without departing from the essential features of the present invention.

The present invention is useful for providing a conductive path so that by removing the waterproof plug in the related art, the number of components and the producing cost can be reduced and the workability in the production also can be improved.

What is claimed is:

1. A shielded connector, comprising:
   a holder formed with a hole; and
   a wire, inserted into and retractable from the hole of the holder, and comprising a conductor and a sheath covering the conductor,
   wherein the sheath is made of a resin composition having elasticity,
   wherein the sheath comprises protrusions formed to be convexly protruding from an outer peripheral surface of the sheath,
   wherein the protrusions have an elasticity so as to be deformable, and
   wherein a height of the protrusions is such that the protrusions are pressed and deformed by an inner surface of the hole so as to prevent an ingress of liquid into the shielded connector.

2. The shielded connector according to claim 1, wherein the height of the protrusions is such that the protrusions are configured to be compressed by the holder.

3. The shielded connector according to claim 1, wherein the protrusions are formed on only a terminal portion of the wire.

4. The shielded connector according to claim 1, wherein a plug is not disposed between the sheath and the holder.

5. A kit comprising:
   a holder of a connector; and
   a wire configured to be inserted into the holder, comprising:
   a conductor; and
   a sheath covering the conductor,
   wherein the sheath comprises a resin composition,
   wherein the sheath comprises at least one protrusion convexly protruding from an outer peripheral surface of the sheath, and
   wherein the at least one protrusion has a height and an elasticity configured to be in contact with the holder so as to prevent an ingress of liquid into the connector when the wire is inserted into the holder.

6. The kit according to claim 5, wherein the height of the protrusions is such that the protrusions are configured to be compressed by the holder when the wire is inserted into the holder.

7. The kit according to claim 5, wherein the at least one protrusion comprises protrusions formed on only a terminal portion of the wire.

* * * * *